United States Patent [19]
Chesters

[11] Patent Number: 5,564,771
[45] Date of Patent: Oct. 15, 1996

[54] LIGHT VISOR

[76] Inventor: Thomas P. Chesters, 1901 Marigold La., Hanover Park, Ill. 60103

[21] Appl. No.: 559,417

[22] Filed: Nov. 15, 1995

Related U.S. Application Data

[63] Continuation-in-part of Ser. No. 315,069, Sep. 29, 1994, abandoned.

[51] Int. Cl.⁶ ........................................................ B60J 3/02
[52] U.S. Cl. .......................... 296/97.5; 296/97.6; 362/191
[58] Field of Search ............................. 296/97.1, 97.5, 296/97.6, 97.7; 362/83.1, 191

[56] References Cited

U.S. PATENT DOCUMENTS

| | | | |
|---|---|---|---|
| 1,224,431 | 5/1917 | Van Vorst | 296/97.7 |
| 1,719,154 | 7/1929 | Wetherbee et al. | 296/97.7 |
| 2,757,955 | 8/1956 | Chester | 296/97.6 |
| 2,894,576 | 7/1959 | Williams | 296/97.6 |
| 3,679,255 | 7/1972 | Nacarato | 296/97.6 |
| 3,940,180 | 2/1976 | Altschul | 296/97.7 |
| 4,003,597 | 1/1977 | Acuff | 296/97.6 |
| 4,090,733 | 5/1978 | Altschul | 296/97.6 |
| 4,982,992 | 1/1991 | Vu et al. | 296/97.6 |
| 4,984,840 | 1/1991 | Lansing | 296/97.6 |
| 5,015,027 | 5/1991 | Rifaat | 296/97.6 |
| 5,033,528 | 7/1991 | Volcani | 160/370.21 |
| 5,040,842 | 8/1991 | Satore | 296/97.6 |
| 5,044,685 | 9/1991 | Yang | 296/97.6 |
| 5,163,752 | 11/1992 | Copeland et al. | 362/191 |
| 5,179,797 | 1/1993 | Edwards et al. | 362/191 |
| 5,404,280 | 4/1995 | Greek et al. | 362/191 |

FOREIGN PATENT DOCUMENTS

| | | | |
|---|---|---|---|
| 581980 | 12/1924 | France | 296/97.7 |
| 2504470 | 10/1982 | France | 296/97.1 |
| 310673 | 3/1937 | Italy | 296/97.7 |
| 2216082 | 10/1989 | United Kingdom | 296/97.5 |

OTHER PUBLICATIONS

"Flexible Map Lamp", J. C. Whitney & Co., Catalog No. 467B, back page.

Primary Examiner—Gary C. Hoge

[57] ABSTRACT

An improved auxiliary shading device for use upon a vehicle sun visor, typically having a flexible shading endpiece of sufficient size to shade the focal light rays of the rising or setting sun or headlamp glare. The shading endpiece is connected to a first end of a movably controllable flexibly rigid tube, which is itself further connective at its opposite end to a compression clip mounting endpiece. The device is used as a supplement to or in lieu of a traditional vehicle visor to shade external focal light glare from the eyes of an operator or passenger. The invention additionally comprehends.

6 Claims, 1 Drawing Sheet

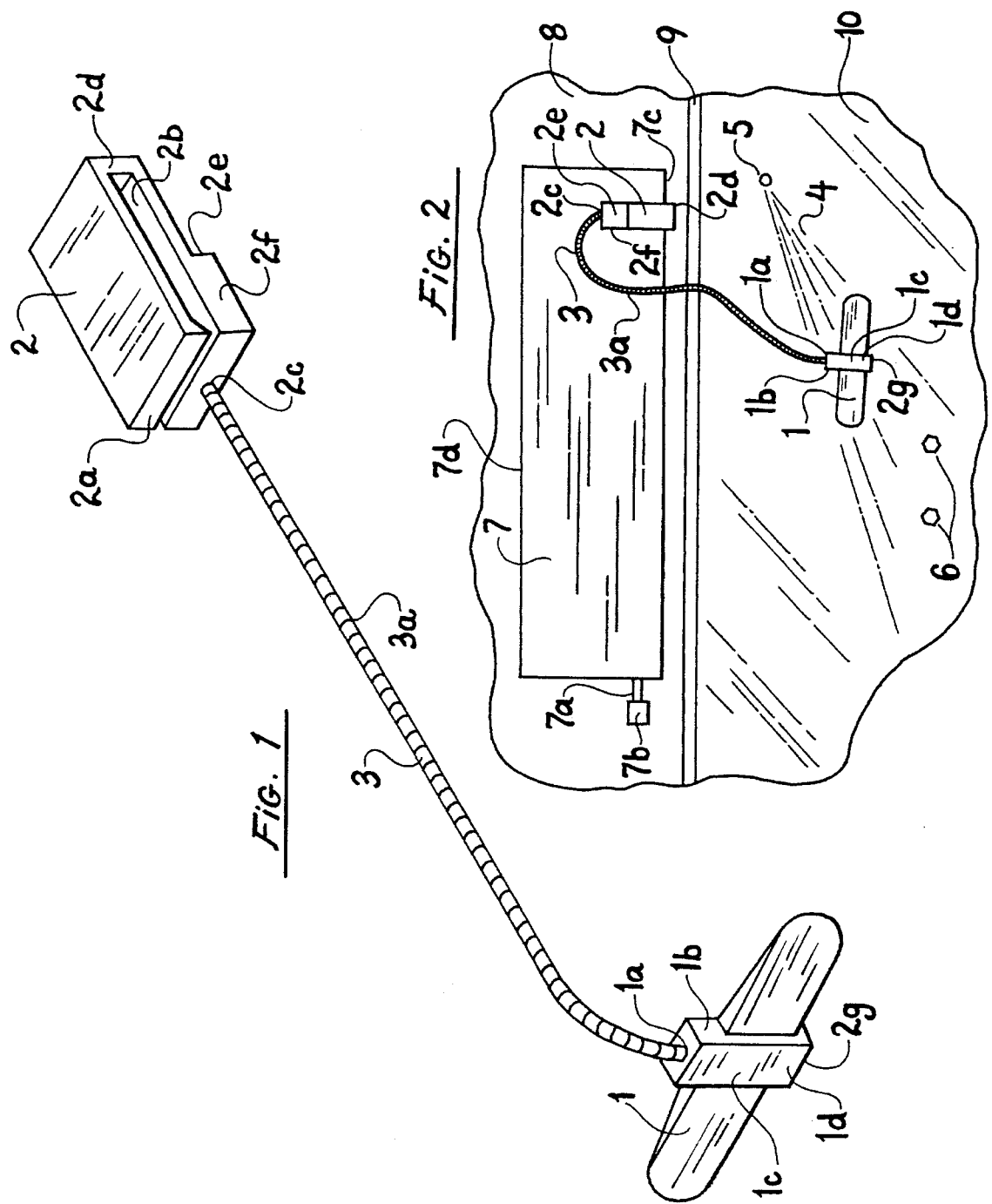

LIGHT VISOR

This application is a continuation-in-part of Ser. No. 08/315,069, filed Sep. 29, 1994, now abandoned.

FIELD OF INVENTION

This invention relates to vehicle sun visors, and specifically to an improved device for shading the eyes.

DISCUSSION OF PRIOR ART

Heretofore, sun visors have typically been movably controllable shading devices, that is, light-blocking or glare-reducing devices, mounted within or upon vehicles. These visors have typically been movable pieces or projecting parts mounted on a friction hinge and/or swivel, and serving as a downwardly and/or laterally rotating, transverse shield against glare from external focal light sources, primarily being sunlight. The primary disadvantages to this typical method of shading means for vehicles are: 1. In addition to blocking the focal point of the light source, a large percentage of the vehicular occupant's view of external surrounds is diminished in accord with the full area of the shading device presented between the incoming angle of the focal light source and the current position of the vehicle occupant's eyes, despite the fact that only a minimal surface area is actually required to be interposed between the focal light source and the eyes to eliminate glare; 2. The effective operation of typical vehicular visors is notoriously difficult due to their overall length and bulk and the friction-regulating mechanisms currently in use; 3. Typical transverse visors, as just described, do not effectively rotate to all the possible angles of incoming light rays relative to a frontal windshield and side windows; 4. Typical transverse visors, as just described, are relatively expensive to produce and install.

Other types of sun visors have been developed in the past which act in extension from or in combination with the aforementioned typical vehicle sun visors, or which operate independently as foldable, extensible, rollable, slidable or otherwise mounted and operated visors. All of these efforts have resulted in visors which suffer from one or more of the aforementioned problems.

Heretofore, unenclosed vehicle users have been limited to shading devices which are typically non-controllable, and rigidly affixed to windshields and other portions of the vehicle, and to headwear such as helmets. The primary disadvantages to such shading devices is their obstruction of user view and inability to be easily adjusted to avoid glare.

OBJECTS AND ADVANTAGES

Accordingly, the objects and advantages of the present invention of an improved light visor either as a supplement to or in lieu of a transverse visor for the occupants of or riders of a vehicle are: a. to provide an improved mounting endpiece suitable for connection with a portion of a vehicle, but which is not required to be directly connective to or operationally dependent upon a friction hinge and/or friction swivel; b. to provide an improved, controllably movable, shading endpiece able to movably block or filter the focal rays of an external light source, irrespective of the normal head positions of the vehicle user, and without diminishing the vehicle user's external view beyond the area of the movable light blocking or filtering shading endpiece; c. to provide an improved method of movably controllable interconnection between the improved mounting endpiece and improved shading endpiece in the form of a flexibly rigid, i.e., a thin, flexible plastic or metal wire, or tubing, or conduit, which will allow the shading endpiece to become movably controllable and temporarily positionally stable with respect to the mounting endpiece as a radial center of operation. These improvements to a light visor will have the further advantages of providing: a. an efficient, inexpensive, easily installed and repositioned shading device; and b. a simple, swift manner of proper interpositioning location of a shading endpiece effectively movable to all the possible angles of incoming focal light rays relative to frontal and side positions between a focal light source and a user's eyes.

Similarly, with respect to the users of all other typical forms of vehicles where light shading is desired, the object of the invention is to provide a simple, inexpensive, easily controllable shading device. Further objects and advantages of this invention will become apparent from a consideration of the drawings and ensuing description thereof.

DRAWINGS

FIG. 1 is a perspective view of a preferred embodiment of the invention.

FIG. 2 is a cutaway perspective view of a preferred embodiment of the invention mounted in an operational position upon a vehicle visor.

DESCRIPTION

The preferred embodiment of the present invention shown in FIGS. 1 and 2 consists of three primary parts which are an elongated, planar, flexible, shading endpiece 1 and a compression clip mounting endpiece 2 which are connectively attached to the opposite ends of a single length of flexibly rigid 3. The shading endpiece 1 is composed of a flexibly rigid, opaque or tinted transparent material made of rubber or plastic, etc., connectively attached to a first end of a pliable, bendable, length of flexibly rigid 3 made of plastic, composite, or metal wire, or conduit, or tubing such as type VVT ID Nickel chrome flexible tubing (as manufactured by Vermont Flexible Tubing, Lyndonville, Vt. 05851), or other semi-rigid, pliable material able to support the movable weight of the shading endpiece 1 while the flexibly rigid 3 is being bent, twisted, or otherwise adjusted into a temporary required shading position.

The opposite or mounting end of the flexibly rigid 3 is connectively attached to the opposing, supportive, mounting compression clip endpiece 2, which is, in the preferred embodiment, also composed of a material such as plastic, composite or metal, which has been formed into a compression clip. The respective connective attachments of the shading endpiece 1 and the mounting endpiece 2 to the flexibly rigid 3, if not made as one unitary plastic, composite, or metal assembly, would be performed as is appropriate for the materials being used to structure the invention. For example, a wire or conduit flexibly rigid 3 would be inserted into the shading endpiece 1 at its shade endpiece mounting hole 1a and into the mounting endpiece 2 at its mounting endpiece mounting hole 2c. The flexibly rigid 3 would then be crimped, and/or soldered, or bolted, or screwed, or riveted to, or pressure inserted within, respective mounting holes 1a, 2c, or held in position utilizing one or more set screws against the flexibly rigid 3 within the respective mounting 1a, 2c.

Typically, the shading endpiece 1 will be in the approximate range of 3½ to 5 inches long and 1 to 1½ inches wide and 1/16 to ¼ inch thick, and generally have its outer edges rounded or tapered and/or protected by an impact-reducing substance such plastic tubing or rubber, etc. Typically, the flexibly rigid 3 will be in the approximate range of 12 to 21 inches in length. Typically, the mounting endpiece 2 will be a clamping device of sufficient size and compressive strength to adequately hold the weight of the flexibly rigid 3 and shading endpiece 1 and, additionally, to prevent or minimize rotation of the mounting endpiece 2 from the torque of manipulation of the shading endpiece 1 and flexibly rigid 3 during positioning by the user of the invention. However, smaller or larger shading and mounting endpieces 1,2 or flexibly rigid 3 length or sizing may be used to suit the environs of the particular vehicle and the specific vehicle visor 7 for which the invention is to be adapte. Alternately, a shading endpiece 1 could be in any shape, size, or curvature which conforms to the present invention's requirement for a small area of interpositioning material between incoming focal light rays 4 from the sun 5 or other intense light source, and a user's eyes 6. And, alternately, if a total light-blocking effect is not desired, the interpositioned material of shading endpiece 1 may be made of a typical tinted transparent light screening, filtering or polarizing material, such as plastic. Alternately, two polarized plastic sheets may be utilized in a transversely hinged manner, or otherwise securely attached to provide an opaque shade 1 when together, and two tinted transparent shades when separated; or, an opaque shade 1 may have a sheet of tinted transparent light screening, filtering or polarizing material transversely hinged to shade 1, or otherwise securely attached to provide an opaque shade 1 when together and an upper opaque shade and lower tinted transparent shade if separated. Alternately, a compression clip mounting endpiece 2 could be levered in the manner of a binder clip, or utilized in conjunction with a screw clamp or cam clamp, or fashioned as a spring clamp, and as such all be forms of the required compression clip mounting endpiece 2 with appropriate forms of connection to the mounting end of the flexibly rigid tubing 3. And alternately, a flexibly rigid 3 may be thicker or thinner, in the form of tube or band, and either of a uniform substance or otherwise formed or manufactured in an articulated manner.

OPERATION

The preferred embodiment of the invention shown in FIG. 1 is shown installed in FIG. 2, having been mounted on a portion of a typical transverse friction vehicle visor 7 as would be found in an automobile, airplane, boat or other vehicle. Vehicle visor 7 is itself mounted on a typical swivel hinge rod 7a and typical friction swivel hinge 7b itself mounted through the roof fabric 8 into a roof backing piece (not shown) just above a typical transverse roof/windshield trim moulding 9. If the swivel hinge 7b has a tightening set screw (not shown) this should be tightened before installation of the invention to discourage unwanted visor rotation. Mounting endpiece 2 is mounted by momentarily spreading apart the forward edges of the upper and lower clip faces 2a,2b of mounting endpiece 2 compressional clip by grasping and sliding clip faces 2a,2b onto a portion of visor 7. Experimentation has shown that the optimal installation point for a one-time installation and storage on a vehicle visor is on the transverse hinge edge 7c with the flexibly rigid 3 extending at a right angle from the transverse hinge edge 7c generally upwards and toward the rear of the vehicle. Such an installation discourages downward rotation of the vehicle visor 7 when the invention is in use because it places the torque on the flexibly rigid 3 more toward the hinge rod 7a than toward the levering upper edge of the vehicle visor 7d. In FIG. 2, shading endpiece 1 is shown pulled downward at its end of the flexibly rigid 3 (at mounting 1a), with the flexibly rigid 3 shown bent temporarily downward with the transverse length of the shading endpiece 1 positioned in a horizontal position. Note that endpiece rear clip end 2d is sufficiently thin to allow visor 7 clearance between its lower edge 7c and the roof fabric 8 to remain rotatable upon its swivel hinge rod 7a and swivel hinge 7b. Thus installed in the described method, the present invention will now be movably controllable upon its mounted endpiece 2. In terms of FIG. 2, shading endpiece 1 may be grasped and pushed or pulled and twisted in various directions in a finite radius about the distance limits of flexibly rigid 3 with mounting endpiece mounting 2c as its focal center, to thereby reach the correct temporary positioning between any incoming light rays 4 passing through the vehicle windshield 10 from a focal source such as the sun 5 or oncoming headlamps (not shown), and a user's eyes 6. When not in use the shading endpiece 1 may be moved into position for storage above or below visor 7. Thus, in terms of the installation method just described, the flexibly rigid 3 may be further controllably bent or twisted to continuously adjust the shading endpiece 1 positioning to better attain a required shading position. Experimentation has shown that optimal control may be attained over shading endpiece 1 positioning manipulation by providing an upper control nub 1b (within which the shade endpiece mounting 1a is contained), a thicker shading endpiece middle section 1c, and a shading endpiece lower control nub 1d, so that the steering (left or right) hand thumb and fingers have sturdy grasping and pressuring points. Experimentation has also shown that the initial intuitive objections to the Light Visor invention are essentially groundless, these objections being the notions that the shading endpiece 1 and/or flexibly rigid 3 and/or mounting endpiece 2 would constitute a view obstruction, or cause visual near/far focusing distortions, or visual distractions during operation, or by its mere presence between the driver or passenger and the vehicle confines, become a safety hazard to the driver or passengers of the vehicle. With very little practice while in a parked position, the user of the Light Visor invention becomes readily familiar with (alternate) one-handed manipulation of the shading endpiece 1 without looking directly at the shading endpiece 1 or flexibly rigid 3 or mounting endpiece 2. Moreover, the shading endpiece 1 by its very miniature sizing never covers a viewing area much greater than the parallax area covered if the user had been staring directly into the focal light source being shaded. Experimentation has shown that if the flexibly rigid 3 is kept to a typical outside diameter of ¼ inch, with a maximal outside diameter of 5/16 inch, no near/far visual distortion will occur for the user of the invention. And finally, the light weight and rounded or protected edges of the various components of the invention make it no more of a threat to the safety of the user or another passenger in the vehicle than any other vehicle visor item might pose.

From the preceding it is clear that the light visor of the invention provides a highly reliable, lightweight, yet economical device that can be used by any vehicle user. Whereas the above description contains many specificities, these should not be construed as limitations on the scope of the invention, but rather as an exemplification of one preferred embodiment thereof. Many other variations are possible. For example, when the vehicle within which the invention is to be used does not have either a visor 7, or roof fabric 8 or trim molding 9, an alternate embodiment of the invention may be utilized wherein an alternate connectively attached spring clip mounted, or screw or bolt mounted, or magnetic mounted, or suction cup mounted, or tab and base fastener mounted, or other alternately supportive, connectively mounted endpiece (not shown) may be utilized as a suitably supportive attachably connective mount to a portion of the vehicle in lieu of the described mounting endpiece 2 to attachably, supportively, connectively mount the flexibly rigid 3 to an available surface or vehicle part within the upper portion of the vehicle. For example, an alternate embodiment of the invention may be made wherein the mounting endpiece 2 has been permanently attached to the lower, transverse visor edge 7c or other portion of a visor 7, e.g., by screwing, bolting, riveting, gluing, or otherwise permanently affixing mounting endpiece 2 upon or within the structure of the vehicle visor 7.

Alternately, the present invention could be made with opposing clip endpieces serving a dual shading and mounting function by elongating the compression clip mounting means 2 so that it more closely approaches the dimensions of the shade 1 so that both such combined shade/clips may be mounted on the vehicle visor 7 and either such combined shade/clip used as a shade 1. Alternately, shading endpiece 1 could be made to extend from one side of the shading end of the flexibly rigid 3 in the manner of a miniature flag, and, further, be made rotatable, and, further, removable and exchangeable with similarly mounted shading endpieces. The structure of such a miniature flag is equivalent to the structure of shade 1, except that the left or right half of shade 1 is removed and the opposite half remaining is extended. Or, the steering sections 1b,1c,1d is made so that the shade 1 will slide through the middle of said steering section until the majority of shade 1 is to one side or the other. The primary advantage to the flag-type configuration of shade 1 is that as its extended end is rotated on the shading end of the flexible tubing 3 the flag extends further out from the endpoint of the flexible tubing, thus increasing the shade's reach. Additionally, to facilitate storage of the shading endpiece 1 on the visor 7, the shading endpiece 1 and mounting endpiece 2 may have added to their construction hook-and-loop type fasteners (such as), so that when the shading endpiece 1 is not in temporary use, it may be attached to either side of the visor 7 against the opposing hook or loop fastener attached to the outer surface of the mounting endpiece 2.

Alternately, virtually any embodiment of the Light Visor invention may be manufactured to suit the dual purpose of being both a miniature focal light shading device and an auxiliary lighting system, i.e., an emergency vehicle light or map-type lighting system with the addition of an electrical power source such as a battery, and a controlling electrical switching device, and an appropriate electrical lighting device, such as an incandescent bulb, and appropriate interconnecting wires.

FIGS. 1 and 2 show a typical arrangement of such a dual purpose invention, wherein a small battery would be housed within the mounting endpiece 2 along with an on-off electrical switch, with wiring extending from the battery/switch in the mounting endpiece 2 through a tube-type flexibly rigid 3 and terminate with an electrical connection with an incandescent bulb appropriately housed in the lower control nub 1d of the shade endpiece 1. However, the placement of the on-off electrical switch 2f could just as well be elsewhere in the electric lighting circuit, such as within the shading endpiece middle section 1c, or in a rotatable type of on-off electric switch in the lower steering nub area 1d. Similarly, the power source 2e for the electric lighting circuit could be elsewhere placed in the circuit. And thus, alternately, the interconnecting wires 3a may be an electric light conduction means, such as a fiber optic wire leading from a bulb or other electric light source in the mounting means 2 through the flexible tube 3 and through the shade 1, terminating at the point where the bulb 2g would otherwise have been located.

Ideally, the electric emergency/map light detachably mounted alternate embodiment of the invention would be reduced to practice using a rechargeable battery power source 2e which utilizes the 12 volt electric system of the vehicle as its recharging means. In such an alternate embodiment, the rechargeable battery power source 2e would be further electrically connected to electric slide contacts in either or both of the inside clip faces 2a,2b so that when the compression clip 2 is attachably mounted on the vehicle sun visor 7 said clip faces 2a,2b would be in direct electrical connection with the external power source from the vehicle electrical system feeding through a set of receptacle slide contacts in the vehicle visor 7 matched to the electric slide contacts in the inside clip faces 2a,2b; or, if the mounting means 2 is permanently affixed to the vehicle visor 7, the 12 volt electrical system of the vehicle may be directly wired into the auxiliary lighting device.

Alternate embodiments of the device used as auxiliary vehicle lights could also have an additional, secondary mounting clip attached to the clip 2 to better enable the clip 2 to be temporarily attached to any required surface such as a vehicle hood or trunk lid or a wheel well trim piece to provide emergency light external to the vehicle, e.g., an additional, secondary mounting clip attached to the clip 2 could be a spring controlled clip face with its hinged spring end attached to the clip end 2d and its forward end aligned with the upper clip face 2a.

In all instances cited above, it is to be understood that the shading endpiece 1 may be either light-blocking or merely light-diminishing. And in all instances cited above, it is to be understood that the essence of the invention is: a. the utilization of a flexibly rigid shading endpiece 1 whose size is only sufficient to shade the focal rays of an external light source, such as the rising or setting sun; b. coupled with a movably controllable flexibly rigid 3 further supportively connective to a temporary or permanent mounting endpiece 2 upon a portion of a vehicle visor 7; c. which, acting cooperatively, allows for a swift and accurate interpositioning of a shading endpiece 1 between an external focal light source 5 and the user's eyes 6. Flexibly rigid 3 would then be rotatable about mounting endpiece 2 in any plane of a 360° arc about mounting endpiece mounting hole 2c where not obstructed by itself or other portions of a vehicle, and would thus permit shading endpiece 1 to be rotatable in any plane of a 360° arc about mounting endpiece 2 in addition to any further required positioning induced by a bending of flexibly rigid 3.

I claim:

1. An auxiliary vehicle sun visor device comprising:
   an elongated, planar, flexibly rigid shading means connected to a flexibly rigid tube with an outside diameter not exceeding 5/16" at a first end thereof;
   a compression clip mounting means suitable for detachably mounting said device to a vehicle sun visor connected to an opposite end of said flexibly rigid tube,
   whereby said device can be detachably mounted to a sun visor of said vehicle, and said flexibly rigid shading means can be placed between the eyes of a driver of said vehicle and a source of light by bending said flexibly rigid tube to adjustably position said flexibly rigid shading means.

2. The auxiliary vehicle sun visor device of claim 1, wherein said flexibly rigid shading means is made in the form of a flag, supportively connected at its width end at an approximate right angle to said first end of said flexibly rigid tube.

3. The auxiliary vehicle sun visor device of claim 1, wherein said flexibly rigid shading means, and said flexibly rigid tube, and said compression clip mounting means, are a unitary assembly made of a plastic-type material.

4. The auxiliary vehicle sun visor device of claim 1, wherein said flexibly rigid shading means is attachably detachable to a first end of said flexibly rigid tube.

5. The auxiliary vehicle sun visor device of claim 1, further comprising an electric lighting circuit wherein is contained:

an electric power source;

electric current conduction means;

electric lighting means; and an electric switch means for selectively activating said electric lighting means, whereby said device may also be used as an auxiliary vehicle light.

6. The auxiliary vehicle sun visor device of claim 1, further comprising an electric lighting circuit wherein is contained:

an electric power source located within said mounting means;

electric lighting means located on said flexibly rigid shading means;

electric current conduction means extending between said electric power source and said electric lighting means forming an electric circuit means; and an electric switch means located within said electric circuit means for selectively activating said electric lighting means, whereby said device may also be used as an auxiliary vehicle light.

* * * * *

UNITED STATES PATENT AND TRADEMARK OFFICE
CERTIFICATE OF CORRECTION

PATENT NO. : 5,564,771  
DATED : November 15, 1996  
INVENTOR(S) : Thomas P. Chesters Page 1 of 3

It is certified that error appears in the above-indentified patent and that said Letters Patent is hereby corrected as shown below:

ABSTRACT, line 11, after (compre) "hends" insert - electric emergency or map lighting embodiments -.
```
Column  2, line  1, after "rigid" insert  -  tubing -.
Column  2, line 34, after "rigid" insert  -  tubing -.
Column  2, line 37, after "rigid" insert  -  tubing -.
Column  2, line 39, after "VVT"   insert  -  .250" OD, .160"
-.
Column  2, line 42, after "rigid" insert  -  tubing -.
Column  2, line 45, after "rigid" insert  -  tubing -.
Column  2, line 53, after "rigid" insert  -  tubing -.
Column  2, line 58, after "rigid" insert  -  tubing -.
Column  2, line 62, after "rigid" insert  -  tubing -.
Column  3, line  3, after "rigid" insert  -  tubing -.
Column  3, line  6, after "rigid" insert  -  tubing -.
Column  3, line 10, after "rigid" insert  -  tubing -.
Column  3, line 12, after "rigid" insert  -  tubing -.
Column  3, line 38, after "rigid" insert  -  tubing -.
Column  3, line 63, after "rigid" insert  -  tubing -.
```

UNITED STATES PATENT AND TRADEMARK OFFICE
CERTIFICATE OF CORRECTION

PATENT NO. : 5,564,771

DATED : November 15, 1996

INVENTOR(S) : Thomas P. Chesters

It is certified that error appears in the above-indentified patent and that said Letters Patent is hereby corrected as shown below:

```
Column   3, line 68, after "rigid" insert    - tubing -.
Column   4, line  3, after "rigid" insert    - tubing -.
Column   4, line  4, after "rigid" insert    - tubing -.
Column   4, line 15, after "rigid" insert    - tubing -.
Column   4, line 22, after "rigid" insert    - tubing -.
Column   4, line 35, after "rigid" insert    - tubing -.

Column   5, line 23, after "rigid" insert    - tubing -.
Column   5, line 40, after "as" insert       - VELCRO -.
Column   5, line 51, after "device" insert   - 2f -.
Column   5, line 52, after "device" insert   - 2g -.
Column   5, line 53, after "wires" insert    - 3a -.
Column   5, line 55, after "battery" insert  - 2e -.
Column   5, line 57, after "switch" insert   - 2f -.
Column   5, line 57, after "wiring" insert   - 3a -.
Column   5, line 57, after "battery/switch" insert
     - 2e,2f -.
```

UNITED STATES PATENT AND TRADEMARK OFFICE
CERTIFICATE OF CORRECTION

PATENT NO. : 5,564,771
DATED : November 15, 1996
INVENTOR(S) : Thomas P. Chesters It is certified that error appears in the above-indentified patent and that said Letters Patent is hereby corrected as shown below:

```
Column  5, line 58, after "rigid" insert - tubing -.
Column  5, line 60, after "bulb"  insert - 2g -.
Column  6, line 40, after "rigid" insert - tubing -.
Column  6, line 45, after "rigid" insert - tubing -.
Column  6, line 52, after "rigid" insert - tubing -.
```

Signed and Sealed this

Twenty-ninth Day of April, 1997

Attest:

BRUCE LEHMAN

*Attesting Officer*  *Commissioner of Patents and Trademarks*